UWE J. SCHMIDT
INVENTOR

BY Robert O. Richardson
ATTORNEY

United States Patent Office 3,508,808
Patented Apr. 28, 1970

3,508,808
DIGIT LIGHT DEFLECTOR
Uwe J. Schmidt, Los Angeles, Calif., assignor, by mesne assignments, to The Bunker-Ramo Corporation, Stamford, Conn., a corporation of Delaware
Continuation of application Ser. No. 228,563, Oct. 5, 1962. This application Apr. 4, 1969, Ser. No. 817,244
Int. Cl. G02f $1/24$, $1/26$; G06k $9/08$
U.S. Cl. 350—150
17 Claims

ABSTRACT OF THE DISCLOSURE

A system for interposition between a source of a beam of plane polarized light and a target having a plurality of positions thereon for deflecting the beam to a target position defined by applied digital control signals. The system includes a plurality of beam deflecting stages disposed between the light source and the target. Each stage includes, in the order of the incoming beam, (1) a polarization switch such as a Kerr cell and (2) a birefringent prism. The Kerr cell acts to polarize the beam in either a first or second plane depending upon the state of the digital control signal applied thereto. The birefringent prism refracts a beam polarized in a first plane by a first angle and a beam polarized in a second plane by a second angle.

---

Figure 1:
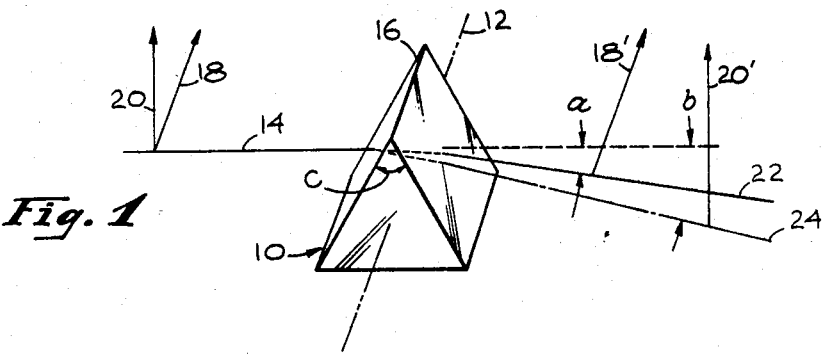

This is a continuation of application, Ser. No. 228,563, filed Oct. 5, 1962 and now abandoned.

This invention relates generally to light beam scanners and more particularly to such a scanner embodying a switching device that selectively switches the plane of polarization of a light beam from one angle to another to thereby cause the light beam, when passed through an anisotropic material, to be switched from one path to another.

In data processing equipment, memories are provided for the storage of bits of information which may be retrieved and used at a later time. These bits of information may be stored in, and retrieved from, discrete memory positions by signals in the form of magnetic, electrical, or optical energy, which act to change a condition of the memory at the desired position. Information can be represented in these memories also by the absence of such a change. In optical storage and retrieval of information it is desirable to reduce the number of light sources needed, and preferable to use a single light source and switch a light beam therefrom to desired memory positions to initiate the storage or retrieval of information.

Light beam position switching represents one of the fastest means of bridging the distance between communicating elements without a need for physical connections therebetween. A prime advantage in optical switching lies in the electrical isolation between the light source, the light beam deflector and the material that reacts to the beam position. Light beams have been deflected mechanically through the use of rotating or oscillating mirrors or prisms wherein the speed of deflection and the accuracy thereof are limited by the mechanical apparatus employed in the switching. If higher scanning speeds and greater accuracy are to be realized, the use of mechanically moving apparatus should be avoided.

Briefly, the invention herein described is based on the recognition that anisotropic materials exhibit different properties along axes in different directions. Background information on the optical properties of anisotropic media may be found on pages 280 to 306 of a text book entitled Optics by Bruno Rossi, published by the Addison Wesley Publishing Co., Inc., Reading, Mass. (Library of Congress Catalog Card No. 57–6520). It has been found that in some anisotropic materials there are relatively great differences in the refractive index for different directions of propagation and polarization of light transmitted therethrough. This phenomenon may be utilized in the practice of the present invention by passing a plane polarized light beam through a birefringent material, which has double refractive properties, and by changing the angle of the plane of polarization of the beam to take advantage of the two refractive indices of the birefringent material to thereby accomplish the desired light beam switching.

In one embodiment a prism is made from a uniaxial birefringent material with its optic axis parallel to the apex. Such a prism has a single optic axis along which the refractive index is the same for all planes of polarization of incident light and double refraction is not present. However, when a light beam is projected through the prism in a direction normal to the optic axis, and the light is polarized in a plane parallel to the apex of the prism, i.e. parallel to the optic axis, the light beam will be deflected through a certain angle, whereas it will be deflected through a different angle for the direction of polarization perpendicular to the optic axis. This state of polarization of the light beam can be switched electronically from the parallel to the perpendicular plane and vice versa by a polarization switch, such as a Kerr cell, to thereby deflect a light beam from one position to another.

This type of light beam deflector is particularly useful in that the command for the actuation of the switching can be applied in digital form. Minor instabilities of voltages feeding the polarizing switches do not influence the direction of deflection unless they are great enough to change the state of polarization. The deflection angles are determined by the apex angles and indices of refraction of the prisms used, by the mechanical alignment of the prisms, and by the polarization state of the switches themselves. It is possible to deflect the light beam through $2^N$ number of different angles in one dimension wherein N is the number of prism and polarization switch combinations or units in the path of the light beam. A second dimension at right angles to the first can be added if alternate units of the apparatus are rotated 90 degrees about the axis of the system. Thus, with twenty such units the light beam can be deflected into $2^{10} \times 2^{10} = 2^{20}$ positions on a beam intersecting surface.

Figure 2:
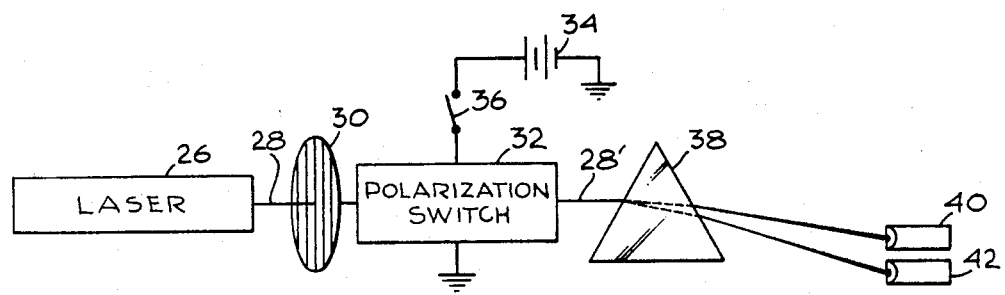
Figure 3:
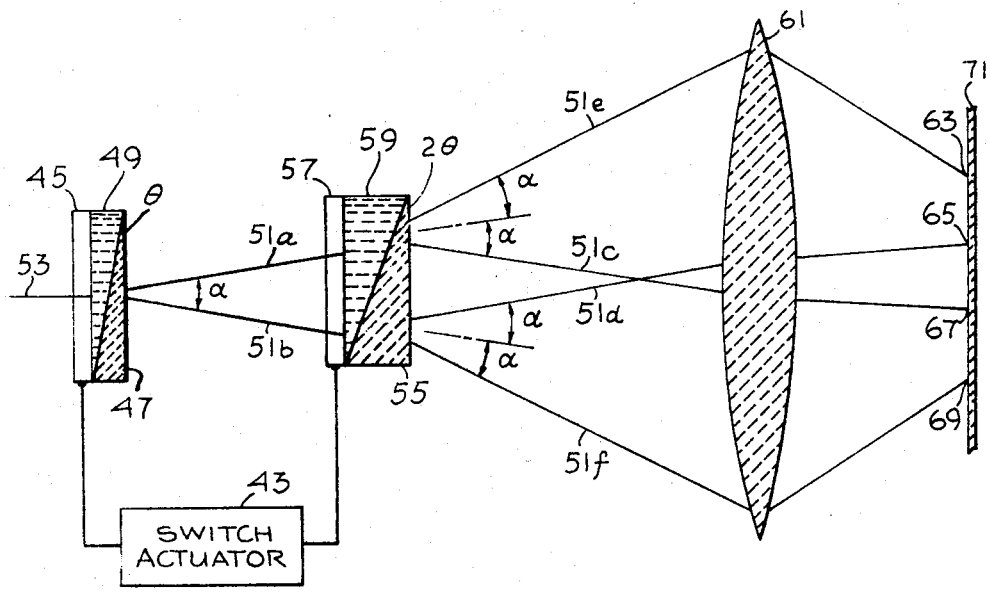
Figure 4:
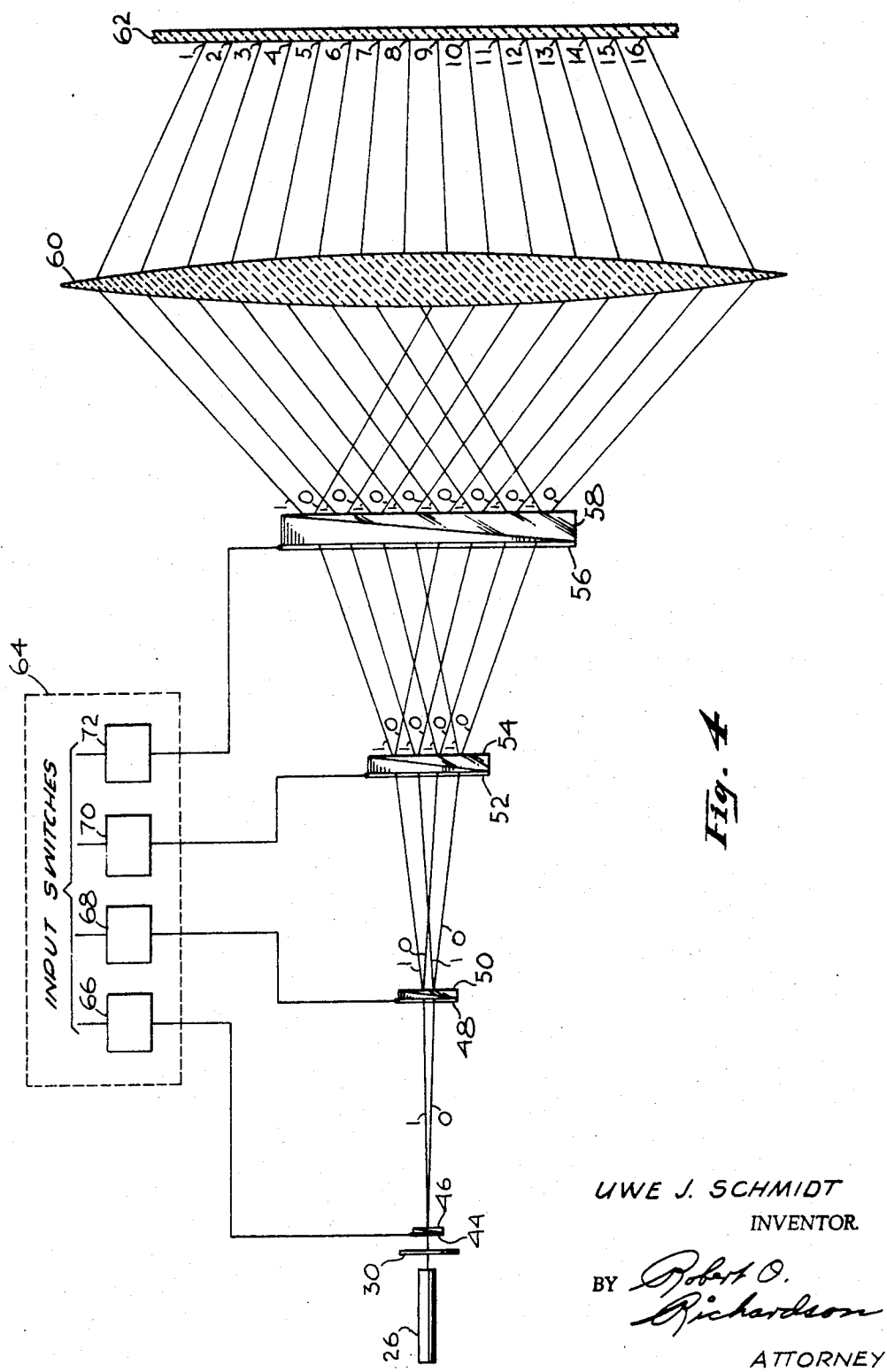
Figure 5:
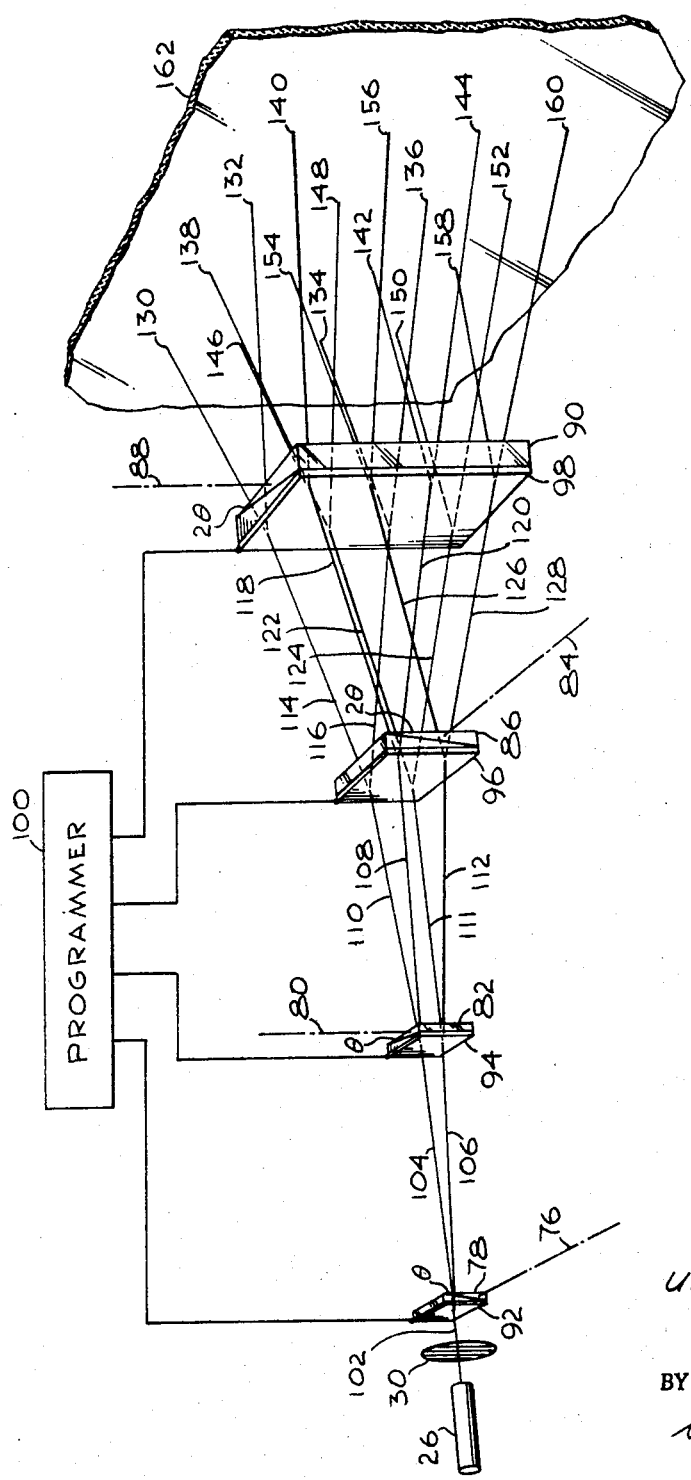

For a better understanding of the invention, reference is made to the following description of several embodiments thereof, taken in conjunction with the accompanying drawings, wherein:

FIG. 1 diagrammatically illustrates the operation of a birefringent prism;

FIG. 2 diagrammatically illustrates a basic form of apparatus embodying the invention;

FIG. 3 schematically illustrates, in somewhat exaggerated form, how a light beam may be deflected through a series of discrete positions in accordance with the invention;

FIG. 4 schematically illustrates, also in exaggerated form, beam switching through a plurality of discrete positions in another embodiment; and FIG. 5 schematically illustrates another embodiment of the invention involving beam switching in two dimensions.

In FIG. 1 there is shown a prism 10 made of uniaxial birefringent material with its optic axis 12 normal to a path 14 of a light beam. Examples of such materials are calcite and quartz. Such a material has a single optic axis (a direction, not a line) along which the refractive index is the same for all planes of polarization of incident light and no double refraction is present. This axis 12 is generally parallel to an apex 16 of the prism. If a light beam is projected along the path 14 and passes through the prism 10 in a direction substantially normal to the optic axis 12, it is found that the emerging light is polarized into a horizontally plane polarized beam and a vertically plane polarized beam. The two beams are refracted by the prism by different amounts, the horizontally plane polarized beam being deflected downwardly through an angle $a$ and the vertically plane polarized beam being deflected by an angle $b$. While the angle $b$ is shown as being larger than the angle $a$, the condition may be reversed, depending upon the type of material used for the prism.

Thus, it follows that if monochromatic light is plane polarized either vertically or horizontally before it enters the prism 10, it will be deflected by the prism by one of two different amounts, depending upon the angle of its plane of polarization. For example, if the light is horizontally polarized in a plane parallel to the optic axis, as represented by the arrow 18, it may follow a path 22 upon emerging from the prism, whereas, if it is vertically polarized perpendicular to the optic axis, as represented by the arrow 20, it may emerge from the prism along a path 24.

As the plane of polarization of a light beam is switched from vertical to horizontal, the beam will change its direction from that indicated by path 24 to that of path 22, and, when the plane of polarization is again changed back to vertical, the beam will move from path 22 back to path 24. In this manner the beam will be switched between the two paths. These directions are determined by the apex angle of the prism, the two indices of refraction of the birefringent material and that of the surrounding medium.

Referring now to FIG. 2 there is shown a conventionally energized source of monochromatic collimated light, such as a laser 26 or other collimated point source of light, which sends a beam 28 through a polarization filter 30, shown here for convenience as passing light rays that are polarized in a vertical plane. The vertically plan polarized rays are then passed through a polarization switch 32 which, when energized, will rotate the plane of polarization by 90°. A battery 34 and switch 36 are shown to illustrate a means for energizing the polarization switch 32. One such form of polarization switch is a Kerr cell. Such a cell may consist of a container filled with nitrobenzene or comparable substance, which is actuatable by application of a potential of approximately 12 kilovolts D.C. A prism 38 of birefringent material is positioned to receive a light beam 28' from the polarization switch 32. This prism has two indices of refraction, one for light having a perpendicular plane of polarization and another for light having a horizontal plane of polarization. The prism is preferably made of calcite, because it exhibits a relatively large difference between the two indices of refraction to thereby provide the greatest angle possible between the two directions of deflection. It should be understood that the prism may be replaced by any body which acts to deflect an incident beam by an angle which is a function of the angle of plane polarization characterizing the beam. Utilization means such as a pair of photocells 40, 42, are positioned in such manner that the light beam from the prism 38 will be projected on one or the other, depending upon the angle of plane polarization of the incoming beam to the prism.

In operation, as voltage is applied to the polarization switch 32, the plane of polarization of the vertically plane polarized light is rotated by the switch to a horizontal direction, and the prism 38, which is between the switch 32 and the photocells 40, 42 and which has a different index of refraction for horizontally polarized light than for vertically polarized light, deflects the projected beam from the photocell 40 to the other photocell 42. In the absence of the application of a voltage to switch 32, the plane of polarization remains unchanged (vertical) and the light beam remains projected onto photocell 40. It should be noted that there is no mid-position between photocells 40 and 42 upon which the beam may be incident, since switch 32 is either sufficiently energized to rotate the angle of polarization by 90° and thus change the angle of refraction of the beam or it is not sufficiently energized and the beam angle is unchanged. There is no third angle to which the beam may be directed. Thus, by using a larger switching voltage to accomplish the switching function than is absolutely necessary, the system may be made relatively immune to voltage fluctuations, and the beam will not be deflected along some undesired path due to voltage instability.

The light beam switching device illustrated in FIG. 2 has many uses. One such use of light beam switching, utilizing the double refraction characteristics of a birefringent material through which the beam is passed, is in a memory storage device which achieves high density storage of information. This requires switching the beam to many positions in both directions over a two-dimensional surface to store or retrieve information, as will be more fully explained hereinafter. FIG. 3 illustrates how the beam may be switched through a plurality of positions in one dimension in response to a switch actuator 43, which selectively energizes a plurality of switches. For explanation purposes there is shown a first Kerr cell acting as a polarization switch 45 and a birefringent prism 47 between which is placed a liquid medium 49 having an index of refraction approximately midway between the two indices of refraction of the birefringent prism 47. For example, with a calcite prism having indices of refraction of 1.658 and 1.486 for horizontally and vertically polarized monochromatic light, respectively, o-toluidine having an index of refraction of 1.570 may be used. In this manner the beam leaving the prism 47 may be deflected upwardly along path 51a or downwardly along path 51b in a symmetrical manner depending upon the angle of the plane of polarization of the light beam 53 due to the energization state of switch 45. Thus, if switch 45 is not energized the beam may be deflected along path 51a, for example, and if switch 45 is energized the beam may be deflected along path 51b. The apex angle of prism 47 between its first and second refracting surfaces is identified as angle $\theta$, which is directly related to the angle $\alpha$ between the two beam paths 51a and 51b.

As previously stated, the number of directions in which the beam may be deflected depends upon the number of switching units. The illustration in FIG. 3 uses two switches to deflect the beam in four directions to illustrate the principles involved, although it is to be understood that a greater number of combinations are operable in accordance with these principles. A second birefringent prism 55 with its associated switch 57 and liquid medium 59 is positioned in the beam paths 51a and 51b. The liquid 59 has an index of refraction midway between the two indices of refraction of prism 55 so that the beam may be deflected upwardly as well as downwardly in a symmetrical manner. The angle of the prism 55 is preferably approximately double that of the first prism 47, in order that the beam entering along path 51a may be deflected upwardly by angle $\alpha$ along path 51e or downwardly by angle $\alpha$ along path 51c for a total difference in deflection of $2\alpha$. Similarly, a beam entering the prism 55 along path 51b will be deflected by the prism upwardly by angle $\alpha$ along path 51d or downwardly through angle $\alpha$ along path 51f. The angle $\alpha$ of deflection is more critical than the prism angle, which is accurate only within certain limits and thus may have to be varied somewhat to obtain the desired deflection. All four beam paths intersect a converging lens 61 which is adapted to focus the collimated light beam along these paths to focal points 63, 65, 67 and 69 on utilization means 71 located at the focal plane of lens 61. The position to which the beam is focused is determined by the angle of incidence of the light beam on the lens. Since the angles of incidence of the beam when on paths 51d, 51c and 51f differ from that of the beam when on path 51e by $\alpha$, $2\alpha$, and $3\alpha$ respectively, the points 63, 65, 67 and 69 are uniformly spaced apart. The utilization means 71 may be a photosensitive film or a mosaic of photosensitive semiconductors or other material, which may be scanned to retrieve the stored information. From FIG. 3, it is seen that there are no light beam paths intersecting lens 61 that are parallel with each other. If the prism angle of prism 55 were the same as the prism angle of prism 47, this would not be the case. Here, however, every different combination of energization states of the switches will cause the angle of incidence of the beam onto the lens to be different, so that the beam will intersect the utilization means 71 at different positions. Thus, there can be no possible redundancy or ambiguity in the switching code used in the positioning of the light beam.

Twenty of these Kerr cell and prism combinations or stages in series will permit the initial beam to be selectively directed along a million separate paths. As previously mentioned, the number of possible paths is equal to $2^N$ where N is the number of Kerr cell and prism combinations used. As will be seen more clearly later with reference to FIG. 5, a second dimension may be added if each stage of the apparatus is followed by another stage that is rotated through 90° so that the pattern of the light positions on the focal plane may be in the form of columns and rows. In this manner it is possible to effectively scan or switch a light beam to discrete positions over an area of a material which will be responsive to the beam position.

Referring now to the embodiment shown in FIG. 4, a monochromatic light source 26 transmits a collimated light beam, which has been polarized by a polarizer 30, through a series of four switches 44, 48, 52 and 56 which in turn control the angle of the plane of polarization of the beam incident on birefringent prisms 46, 50, 54 and 58. The birefringent prisms may be of a very small apex angle, if desired, to provide a high density of discrete focal points over a given area of display medium or other utilization means. The total angular beam deviation from one extreme to the other on the display medium, as measured at the source, may be quite small. This total beam deviation, by way of example, may be on the order of one degree when twenty sets are used to switch through over a million positions.

In FIG. 4 each of the lines between the various prisms and switches represents a path along which the light beam may be deflected. The beam is collimated and has a finite cross-section, and all beam paths intersect a lens 60 at different angles of incidence. Thus, the lens 60 focuses the beam on utilization means 62 at one of sixteen evenly spaced positions, in the manner described with reference to FIG. 3. The utilization means 62 may be a storage device such, for example, as an image orthicon, a storage tube, a photographic device or other arrangement. Alternatively, the lens 60 may represent a projection system for projecting the beam on display means, such a map or a plotting board.

A programmer 64 is shown diagrammatically as having electronic switches 66, 68, 70, 72 connecting polarization switches 44, 48, 52 and 56 to suitable signal inputs, such as binary coded signals from a computer, for example. One form of electronic switch may comprise hydrogen-filled thyratrons pulsed by multivibrators in accordance with the incoming signals. Of course, other types of switches may be used, depending upon the nature of the input signals. For convenience, the various positions of the beam on the display device 62 are numbered 1–16 and the code of the energization and nonenergization of the various polarization switches may be as shown in the following table, wherein the numerals 1–16 in the single digit columns refer to beam position and the associated four-digit columns refer to the energization of the polarization switches through electronic switches 66, 68, 70 and 72, respectively, 0 indicating nonenergization and 1 indicating energization. For convenience, the uppermost of each of the two beam paths is shown as a 1 and the lowermost path as a 0.

| | |
|---|---|
| 1 | 1111 |
| 2 | 0111 |
| 3 | 1011 |
| 4 | 0011 |
| 5 | 1101 |
| 6 | 0101 |
| 7 | 1001 |
| 8 | 0001 |
| 9 | 1110 |
| 10 | 0110 |
| 11 | 1010 |
| 12 | 0010 |
| 13 | 1100 |
| 14 | 0100 |
| 15 | 1000 |
| 16 | 0000 |

There is shown in FIG. 5 an arrangement for deflecting a light beam to two dimensional positions on a light sensitive material placed across the beam paths. Here is shown a number of polarization switch and birefringent prism combinations in series with the apexes and optic axes of alternate prisms rotated 90° about the system axis. Thus the optic axis 76 of prism 78 is positioned horizontally and the optical axis 80 of prism 82 extends vertically. Optic axis 84 of prism 86 extends horizontally and optic axis 88 of prism 90 extends vertically. Both prism 78 and prism 82 have angles at their apexes equal to $\theta$, and prisms 86 and 90 have angles at their apexes equal to $2\theta$. Polarization switches 92, 94, 96 and 98 are positioned in front of the prisms 78, 82, 86 and 90, respectively, and are individually energized from a programmer 100 in a manner similar to the energization of the polarization switches in FIG. 4. Switch 92 controls the deflection of beam 102 between vertically spaced paths 104 and 106. Switch 94 and prism 82 control the deflection of the beam along path 104 between horizontally spaced paths 108 and 110, as well as the deflection of the beam along path 106 between paths 111 and 112. Switch 96 controls the refraction by prism 86 of a beam along path 110 between vertically spaced paths 114 and 116, the beam along path 108 between vertically spaced paths 118 and 120, the beam along path 111 between vertically spaced paths 122 and 124, and the beam along path 112 between vertically spaced paths 126 and 128. Switch 98 and prism 90 in turn control the horizontal deflection of the beam along path 114 between paths 130 and 132, path 116 between horizontally spaced paths 134 and 136, the beam along path 118 between horizontally spaced paths 138, 140, the beam from path 120 between horizontally spaced paths 142, 144. Switch 98 and prism 90 also control the deflection of a beam along path 122 between horizontally spaced paths 146, 148, the beam from path 124 between horizontally spaced paths 150 and 152, the beam along path 126 between horizontally spaced paths 154 and 156, and the beam along path 128 between horizontally spaced paths 158 and 160. In this manner beam 102 by the selection of various combinations of energized and nonenergized polarization switches 92, 94, 96 and 98, may be deflected in rows and columns in a two-dimensional pattern across the face 162 of a photosensitive material or other utilization means. With four sets of deflection units the beam may intersect the material surface 162 in sixteen discrete positions.

Having thus described the invention in terms of its various forms, it is to be understood that other forms are possible.

What is claimed is:
1. In combination:
   a source providing a substantially collimated light beam polarized in a single plane;
   a plurality of light sensitive means;

means providing control signals selecting one of said plurality of light sensitive means; and deflection apparatus responsive to said control signals for deflecting said light beam to the one of said plurality of light sensitive means selected by said control signals;

said deflection apparatus including a plurality of stages fixedly disposed in series between said source providing said light beam and said light sensitive means;

each of said stages including a first polarization rotating means and a birefringent means with said first polarization rotating means being located closer to said source;

each of said first polarization rotating means being responsive to said control signals for selectively rotating the plane of polarization of a polarized light beam incident thereon by 90° from a first to a second plane;

each of said birefringent means refracting light incident thereon polarized in said first and second planes respectively along first and second angular paths lying in a common plane.

2. The combination of claim 1 wherein said source, said plurality of light sensitive means and said stages are in alignment with respect to a common axis; and refracting means included in each of said stages between the first means and birefringent means thereof for sufficiently refracting a beam incident thereon so that said first and second angular paths are symmetric with respect to said common axis.

3. The combination of claim 1 wherein said control signals are comprised of a number of binary digits at least equal to said plurality of stages; and means coupling a different one of said binary digits to each of said stages.

4. The combination of claim 1 wherein some of said stages are oriented such that said common planes defined thereby extend in a first direction and wherein other of said stages are oriented such that said common planes defined thereby extend perpendicular to said first direction whereby said light beam can be deflected in two perpendicular directions.

5. The combination of claim 1 wherein said first and second angular paths defined by a first of said birefringent means are spread by a first angle and wherein said first and second angular paths defined by other of said birefringent means are spread by a different multiple of two of said first angle.

6. The combination of claim 5 including a converging lens disposed between said deflection apparatus and said plurality of light sensitive means;

said plurality of light sensitive means being disposed in the focal plane of said converging lens.

7. A light beam deflection system for interposition between a source of a beam of plane polarized light and a target to deflect the beam to a selected position in the target, comprising:

a plurality of aligned cascaded beam deflecting stages, each having in the order of the incoming beam of light;

means for rotating the plane of polarization of the beam of light transmitted therethrough into one of two mutually orthogonal planes; and birefringent means for transmitting the beam of light along one of two different paths dependent on the plane of polarization of the light.

8. A beam deflection system for interposition between a source of a beam of plane polarized light and a target to deflect the beam to a selected position in the target under the control of digital signals, comprising a plurality of aligned cascaded beam deflecting stages each having in the order of the incoming beam of light means adapted to be supplied with digital signals for rotating the plane of polarization of the beam of light transmitted therethrough into one of two mutually orthogonal planes under the control of the supplied digital signals, and birefringent means for transmitting the beam of light along one of two different paths dependent on the plane of polarization of the light; and in which the plurality of aligned cascaded beam deflecting stages include a first plurality of stages in which the respective birefringent means have orientations providing deflections along a first common coordinate and have respective dimensions along the direction of beam transmission that are successively different in the order of the incoming beam of light, said plurality of beam deflecting stages including a second plurality of stages in which the respective birefringent means have orientations providing deflections along a second common coordinate orthogonal to said first coordinate and have respective dimensions along the direction of beam transmission that are successively different in the order of the incoming beam of light.

9. A beam deflection system for interposition between a source of a beam of plane polarized light and a target to deflect the beam to a selected position in the target under the control of digital signals, comprising a plurality of aligned cascaded beam deflecting stages each having in the order of the incoming beam of light means adapted to be supplied with digital signals for rotating the plane of polarization of the beam of light transmitted therethrough into one of two mutually orthogonal planes under the control of the supplied digital signals, and birefringent means for transmitting the beam of light along one of two different paths dependent on the plane of polarization of the light.

10. A beam deflection system according to claim 9 in which the plurality of aligned cascaded beam deflecting stages are at least three in number.

11. A beam deflection system according to claim 9 in which at least some of the plurality of birefringent means have respective differing dimensions to provide respective deflections that are multiples of a smallest deflection.

12. A beam deflection system according to claim 9 in which at least some of the plurality of birefringent means have orientations providing deflections along the same coordinate and have respective dimensions along the direction of beam transmission that are successively different in the order of the incoming beam of light.

13. A beam deflection system for selectively illuminating positions in a target, comprising a source of a beam of plane polarized light, a source of a multiple-bit digital signal for identifying a selected position in the target, and a plurality of aligned cascaded beam deflecting stages each having in the order of the incoming beam of light, means adapted to be supplied with a respective bit of said digital signal for rotating the plane of polarization of the beam of light transmitted therethrough into one of two mutually orthogonal planes, and birefringent means for transmitting the beam of light along one of two different paths dependent on the plane of polarization of the light.

14. A beam deflection system according to claim 13 in which at least some of the plurality of birefringent means have orientations providing deflections along a first coordinate and have respective dimensions along the direction of beam transmission that are successively different in the order of the incoming beam of light.

15. A beam deflection system according to claim 14 in which
the remainder of the plurality of birefringent means have orientations providing deflections along a second coordinate orthogonal to said first coordinate and have respective dimensions along the direction of beam transmission that are successively different in the order of the incoming beam of light.

16. A beam deflection system according to claim 13 in which
at least some of the plurality of birefringent means have orientations providing deflections along a first coordinate and have respective dimensions along the direction of beam transmission that are successively different in the order of the incoming beam of light and in which
the remainder of the birefringent means have orientations providing deflections along a second coordinate orthogonal to said first coordinate and have respective dimensions along the direction of beam transmission that are successively different in the order of the incoming beam of light.

17. The system of claim 7 wherein said means for rotating the plane of polarization comprises means responsive to electrical signals to rotate the plane of polarization of the beam of light transmitted therethrough.

References Cited

UNITED STATES PATENTS

| | | | |
|---|---|---|---|
| 1,770,535 | 7/1930 | Sukumlyn | 88—65 |
| 2,262,524 | 11/1941 | Ball. | |
| 2,467,325 | 4/1949 | Mason | 88—65 |
| 2,915,943 | 12/1959 | Brown et al. | 88—61 |
| 2,933,972 | 4/1960 | Wenking | 88—61 |
| 2,936,380 | 5/1960 | Anderson. | |

FOREIGN PATENTS 675,357    7/1952    Great Britain.

DAVID SCHONBERG, Primary Examiner

R. J. STERN, Assistant Examiner

U.S. Cl. X.R.

250—220, 225; 350—157, 160; 356—71